July 23, 1957 S. COLEMAN ET AL 2,800,522
BATTERY TERMINAL PROTECTORS
Filed June 21, 1955

INVENTORS
Sidney Coleman & Roger L. Nowak
BY Sigmund Herzog
attorney.

United States Patent Office 2,800,522
Patented July 23, 1957

2,800,522
BATTERY TERMINAL PROTECTORS

Sidney Coleman, Maynard, and Roger L. Nowak, West Boylston, Mass., assignors to Van Brode Milling Co., Inc., Clinton, Mass., a corporation of Massachusetts Application June 21, 1955, Serial No. 516,976

2 Claims. (Cl. 136—135)

The present invention relates to improvements in protective devices for the terminals of storage batteries, to prevent corrosion of said terminals by the electrolyte of the batteries or by other liquid or solid materials. The invention pertains more particularly to that type of protective shields or housings which are attached to the battery cables and terminal connectors.

Terminal protectors of the character mentioned have been provided heretofore but have been found defective in that they either require dismantling of elements of the battery cables to permit mounting of the shields or housings on said cables, or they are not firmly secured to said cables and, thus, do not tightly hug the battery terminals.

With these objections in mind, it is the primary object of the present invention to provide a battery terminal protector, in the form of a shield or housing having an opening through which the battery cable may be passed without disassembling the latter, and which includes elements for firmly securing the same in position on the cable, thereby insuring a tight hug of the shield or housing around the battery terminal.

Another object of the invention is to form the protective shield or housing of a suitable electric insulating plastic material, sufficiently rigid to retain its shape and resilient enough to permit convenient mounting thereof on the battery cable without disassembling the latter.

With these and other objects in view, which will more fully appear as the nature of the invention is better understood, the same consists in the combination, arrangement and construction of the parts hereinafter described, pointed out in the appended claims and illustrated in the accompanying drawings, it being understood that many changes may be made in the size and proportion of the several elements and details of construction within the scope of the appended claims, without departing from the spirit or sacrificing any of the advantages of the invention.

Two of the many possible embodiments of the invention are illustrated in the accompanying drawings, in which.

Figure 1:
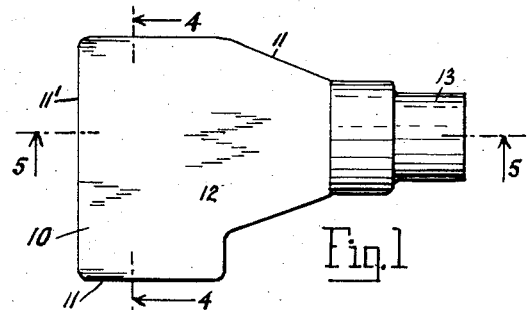
Figure 1 is a top plan view of a protective shield constructed in accordance with the present invention.
Figure 2:
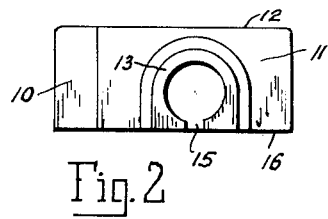
Figure 2 is a side elevation thereof.
Figure 3:
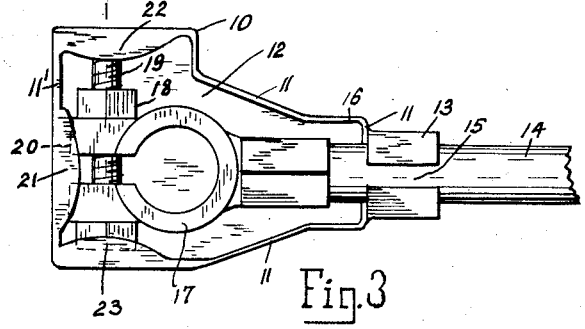
Figure 3 is a bottom plan of the same with the battery cable extended therethrough.
Figure 4:
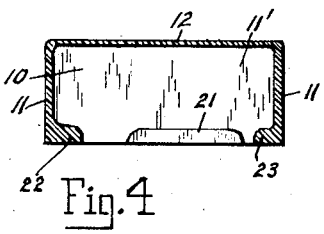
Figure 4 is a section taken on line 4—4 of Fig. 1.
Figure 5:
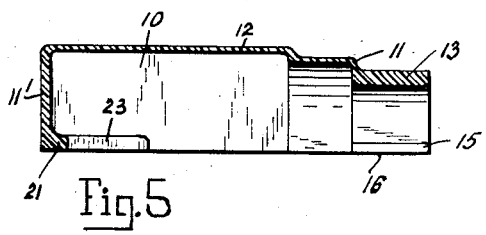
Figure 5 is a section taken on line 5—5 of Fig. 1.

Referring now first to Figs. 1 to 5, inclusive, of the drawings, the numeral 10 designates, as a whole, a one-piece protective shield or housing. It is formed of a suitable electric insulating, preferably, synthetic plastic material and comprises side walls 11 and a top wall 12. The plastic material employed must be of sufficient rigidity so that the shield or housing will keep its shape, but at the same time flexible or resilient enough to permit its side walls to be deflected, for a purpose hereinafter to be described. One of said side walls is provided with a tubular protuberance 13, through which the cable 14 of the battery connector is adapted to be passed. A slit 15 runs throughout the length of the protuberance, said slit communicating with the bore of the latter and extending to the bottom edge 16 of the shield. The protuberance is of substantial length and thickness, and the diameter of its bore corresponds to that of the cable, so that the latter is firmly gripped by the protuberance when extended into the shield. The slit 15 facilitates insertion of the cable into the protuberance bore, it permitting the protuberance to be deflected to enlarge the slit to a width exceeding the cable diameter, the deflected portions being allowed to spring back to their normal positions after the cable has hbeen received in the bore of the protuberance.

The shield is shaped to receive the battery connection of the cable. This connection includes a split terminal clamp 17, adapted to surround the battery terminal and being clamped thereto by tightening a nut 18 and bolt 19, the latter extending through the split portion of the clamp, as clearly shown in Fig. 3 of the drawings. As appears from the last-mentioned figure, the cable 14 extends radially from the circular section of the clamp 17. Hence, when the clamp is within the shield, the free edge 20 of the split end of the clamp is located adjacent the shield side wall 11', the latter being disposed opposite that shield side wall on which the protuberance 13 is arranged. On the side wall 11' is formed, above the open bottom of the shield, an inwardly extending projection 21, adapted to overlie the split end of the clamp 17. On the shield side walls adjacent the wall 11' are formed, also above the open shield bottom, inwardly extending projections 22 and 23, adapted to overlie the ends of the bolt 19 when the clamp 17 is disposed within the shield. The projections 21, 22 and 23 are of substantial thickness and those portions of the side walls on which these projections are formed may also be thickened, thereby imparting sufficient strength to said projections, properly to anchor the shield to the clamp 17.

It will be noted from the foregoing description that the shield is so formed as to permit attachment thereof to the battery without in any way necessitating any element of the battery, including its cable and its clamp, being disassembled. Assuming that the battery clamp 17 is fastened to the battery terminal by having properly tightened the nut 18 and bolt 19, the shield is affixed to the clamp by inserting the cable into the protuberance 13 in the manner above described, and sliding the projections 21, 22 and 23 below clamp and its bolt. The shield so attached rests with its open bottom flat against the exposed face of the battery top and thereby prevents moisture and other foreign matter coming into contact with the battery terminal and cable clamp, and, thus, precludes corrosion of these elements. It also insulates these elements, thereby guarding against short circuiting thereof with metallic elements either on or adjacent the battery.

Figure 6:
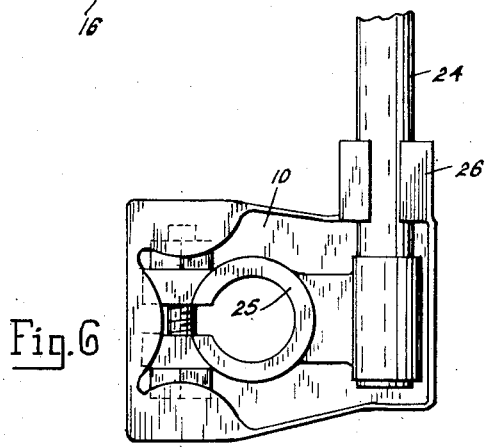
Figure 6 is a bottom plan view of a modified protective shield in position on the end of a battery cable.

The modification illustrated in Fig. 6 of the drawings differs from the one above disclosed only in that the cable 24 of the same runs at right angles to the longitudinal axis of its clamp 25. Hence, the tubular protuberance 26 of this shield is also running at right angles to the longitudinal axis of said clamp. Otherwise the construction and operation of this device are in all respects identical with those described in connection with the appliance illustrated in Figs. 1 to 5, inclusive.

What we claim is:

1. A housing for a storage battery terminal and the cable connection thereof formed of electric insulating plastic material sufficiently rigid so that said housing will retain its shape and resilient enough to permit its walls to be deflected, comprising, in one integral piece, a shield open at its bottom and including a top wall and side walls, a tubular protuberance on one of said side walls provided with a longitudinal slit running throughout the length of said protuberance and extending down to the bottom edge of said shield, said protuberance being adapted to be slipped over a battery cable by deflecting said protuberance to enlarge said slit to a width exceeding the diameter of said cable, the deflected portions springing back to their normal positions after the cable has been received in said protuberance, said shield being shaped to house part of said cable and the battery connection associated therewith, and means on said shield adapted to engage the underface of said battery connection, whereby said shield is anchored to said connection, the lower edges of said side walls being adapted to rest flat on the exposed face of the battery cover from which said battery terminal projects.

2. A housing for a storage battery terminal and the cable connection thereof according to claim 1, said anchoring means consisting of projections on the inner faces of said side walls adapted to engage the underface of said battery connection.

References Cited in the file of this patent

UNITED STATES PATENTS

| | | |
|---|---|---|
| 1,722,203 | Day | July 23, 1929 |
| 1,882,587 | Heatwole | Oct. 11, 1932 |
| 1,951,591 | Anzalone et al. | Mar. 20, 1934 |